United States Patent
Urbach

(10) Patent No.: US 8,553,028 B1
(45) Date of Patent: Oct. 8, 2013

(54) EFFICIENTLY IMPLEMENTING AND DISPLAYING INDEPENDENT 3-DIMENSIONAL INTERACTIVE VIEWPORTS OF A VIRTUAL WORLD ON MULTIPLE CLIENT DEVICES

(76) Inventor: Julian Michael Urbach, Valley Village, CA (US)

( * ) Notice: Subject to any disclaimer, the term of this patent is extended or adjusted under 35 U.S.C. 154(b) by 1352 days.

(21) Appl. No.: 12/034,163

(22) Filed: Feb. 20, 2008

Related U.S. Application Data

(60) Provisional application No. 60/983,320, filed on Oct. 29, 2007.

(51) Int. Cl.
*G06T 15/00* (2011.01)

(52) U.S. Cl.
USPC .......................... 345/419; 345/427; 345/473

(58) Field of Classification Search
None
See application file for complete search history.

(56) References Cited

U.S. PATENT DOCUMENTS

| | | | | |
|---|---|---|---|---|
| 5,736,982 | A * | 4/1998 | Suzuki et al. | 715/706 |
| 5,907,328 | A * | 5/1999 | Brush, II et al. | 715/863 |
| 6,088,698 | A * | 7/2000 | Lipkin | 1/1 |
| 6,141,693 | A * | 10/2000 | Perlman et al. | 709/236 |
| 6,684,255 | B1 * | 1/2004 | Martin | 709/231 |
| 2001/0037402 | A1 * | 11/2001 | Schneider | 709/236 |
| 2002/0015042 | A1 * | 2/2002 | Robotham et al. | 345/581 |
| 2003/0112237 | A1 * | 6/2003 | Corbetta | 345/426 |

OTHER PUBLICATIONS

Umenhoffer, Tamas, "Robust Multiple Specular Reflections and Refractions", Chapter 17, CPU Gens 3, Edited by Hubert Nguyen, NVIDIA Corporation, 2008.

* cited by examiner

*Primary Examiner* — Said Broome
(74) *Attorney, Agent, or Firm* — James J. DeCarlo; Greenberg Traurig, LLP

(57) ABSTRACT

Methods, apparatuses and systems directed to efficiently circumventing the limitations of client side rendering of virtual worlds. In a particular implementation, a proposed system renders each client viewport remotely, removing the burden of rendering a 3D scene from the local client device. 3D viewports, rather than being rasterized on the local client, are instead generated on a remote render device which then transmits a visual representation of the viewport to the client device in a format (including, but not limited to a video stream) which the client can use to display the scene without requiring complex 3D rasterization. This process eliminates the need for the client to have any specialized 3D rendering software or hardware, or to install or download any persistent render assets on the local system. The hardware requirements for the client are therefore roughly equivalent to those needed to play a continuous video stream.

18 Claims, 6 Drawing Sheets

FIG._4

EFFICIENTLY IMPLEMENTING AND DISPLAYING INDEPENDENT 3-DIMENSIONAL INTERACTIVE VIEWPORTS OF A VIRTUAL WORLD ON MULTIPLE CLIENT DEVICES

CROSS-REFERENCE TO RELATED APPLICATION

The present application claims priority to U.S. Provisional Application Ser. No. 60/983,320 filed Oct. 29, 2007.

TECHNICAL FIELD

The present disclosure generally relates to rendering of virtual world spaces in three-dimensions and, more particularly, to efficient and scalable mechanisms for remote device, or server-side, three-dimensional rendering across a large number of client devices.

BACKGROUND

Three-dimensional (3D) virtual worlds (for example, World Of Warcraft, Second Life, Runescape, etc.) allow users to enter and move about, as well as interact with other users and objects, within a three-dimensional virtual environment. Such 3D virtual worlds systems generally operate in the following manner:

1) They require a 3D rendering engine to be resident on the client's system in order to render a user's viewport into the 3D world.

2) The 3D rendering software further requires that the client machine have certain graphics processing capabilities which allow the 3D world to be rendered on the local machine. The more complex the world, the more powerful the client device's graphics capabilities must be.

3) In order for a user to view a scene on her local system, the 3D rendering engine must have access to the assets necessary to build the scene accurately. Such assets typically include geometry mesh data (vertices, index and attribute buffers), material and shader definitions (including procedural shaders), and texture maps. As scene complexity increases, the amount of data required to render a scene on a local client increases as well. Assets for such complex virtual worlds are often included in a download or DVD that the user must first install before the 3D rendering engine on the local client can begin rendering a scene. Therefore, the more complex and dense the virtual world, the more data the user must either have installed or download on their system. Instantaneous virtual world rendering systems that depend on streaming render assets for client-side rendering may introduce objectionable visual artifacts as a viewport is procedurally refreshed with new textures and meshes that replace placeholder versions.

4) Virtual world systems generally use a centralized server system to persistently maintain the state of the world. State data from these servers are continuously sent to each client when needed (including position, orientation, velocity and dynamics of objects within the world) in order for each viewport to remotely render the scene on the client's local machine. If all clients have the same assets, and the same hardware graphics capabilities, visual parity across each client viewport is possible.

However, the overhead of synchronizing states across each user's viewport when the client systems are not homogenous can become problematic in many cases, as the visual representation of the same viewport may vary across each client, based on the client's local graphics capabilities. For example, if a faceted 3D object is tessellated and smoothed in hardware on a client system which supports curved patch tessellation, the silhouette of the object may appear to be significantly different than the silhouette of the same object on a client that does not support tessellation. In the latter case, the client would be forced to render the 3D object with a faceted outline. These differences can create objectionable discontinuities among remotely rendered viewports in cases where collision detection is performed by the server on the aforementioned 3D object. If the server performs collision detection using the smooth tessellated version of the object, and then transmits this singular result to each client, the visual representation of the point of impact and bounce vector from the collision may not appear to correspond to a valid point and slope on the surface of the object from the point of view of a user displaying the scene without tessellation. This can become even more objectionable, when the tessellation is performed on a macroscopic object such as terrain, where control of vehicles or avatars depends heavily on an accurate representation of the ground surface. These types of discontinuities between the state of world on the server, and the visual representation on an arbitrary client, increases significantly as a 3D virtual world becomes more complex, and the range of client devices that need to be supported expands to mobile phones, TV set top boxes and other hardware that may have limited or no 3D graphics capabilities on the local machine.

SUMMARY

In particular embodiments, the present invention provides methods, apparatuses and systems directed to efficiently circumventing the limitations of client-side rendering of virtual worlds. In a particular implementation, a virtual world system renders each client viewport remotely, removing the burden of rendering a 3D scene from the local client device. 3D viewports, rather than being rasterized on the local client, are instead generated on a remote render device which then transmits a visual representation of the viewport to the client device in a format (including, but not limited to a video stream) which the client can use to display the scene without requiring complex 3D rasterization. This process eliminates the need for the client to have specialized 3D rendering software or hardware, or to install or download any persistent render assets on the local system. The hardware requirements for the client, in one implementation, can, therefore, be reduced to that roughly equivalent to those needed to play a continuous video stream.

DESCRIPTION OF EXAMPLE EMBODIMENT(S)

The following example embodiments are described and illustrated in conjunction with apparatuses, methods, and systems which are meant to be illustrative, not limiting in scope.

A. Overview

A.1. Network Environment

Figure 1:
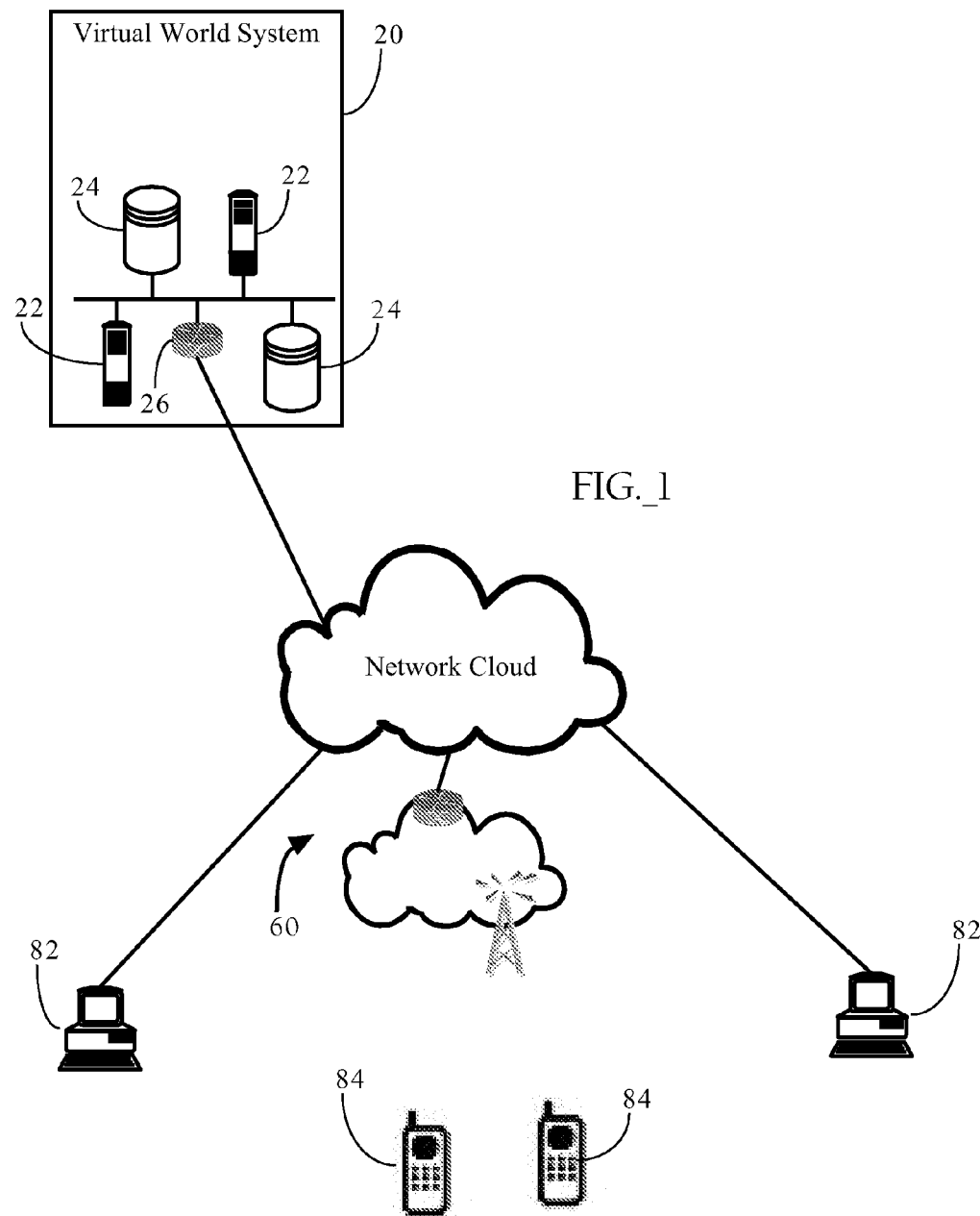
FIG. 1 is a schematic diagram illustrating a computer network environment in which implementations of the invention may operate.

FIG. 1 illustrates an example network environment in which particular implementations of the invention may operate. As FIG. 1 illustrates, particular implementations of the invention may operate in a network environment comprising a virtual world system 20 that is operatively coupled to a network cloud 60, which may include the Internet. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. Some of the networks in network cloud 60 may be circuit-switched networks. The computer network environment, including network 60 can be a packet-based communications environment, employing TCP/IP protocols (for example), and/or other suitable protocols, and has a plurality of interconnected digital packet transmission stations or routing nodes. Client nodes 82 and 84 are operably connected to the network environment via a network service provider or any other suitable means. Client nodes 82 and 84 may include personal computers or cell phones, as well as other types of mobile devices such as lap top computers, personal digital assistants (PDAs), etc.

Virtual world system 20 is a network addressable system that hosts a virtual world or environment accessible to one or more users over a computer network. The virtual world system 20 may include web site and server functionality where users may request and receive identified web pages and other content over the computer network. The virtual world system may also allow users to configure and maintain personal avatars and interact with other avatars and objects hosted within a virtual environment.

In particular implementations, virtual world system 20 comprises one or more physical servers 22 and one or more data stores 24. The one or more physical servers 22 are operably connected to computer network 60 via a router 26. The one or more physical servers 22 host functionality that allows users to interact with the virtual world, such as receiving requests from, and transmitting responsive data to, client nodes 82 and 84. In one implementation, the functionality hosted by the one or more physical servers may include web or HTTP servers, RTSP servers, and the like.

Physical servers 22, as discussed above, host functionality directed to supporting and implementing virtual world system 20. In a particular implementation, the physical servers 22 may host one or more instances of a virtual world server and one or more instances of a remote rendering device server. In one implementation, a data store 24 may store user information and state information of avatars and other objects or assets maintained in the virtual environment. A given data store 24 may also store content such as digital content data objects, user information, and other media assets. A content data object or a content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects, object or asset definitions, etc. Structurally, content data store 24 connotes a large class of data storage and management systems. In particular implementations, content data store 24 may be implemented by any suitable physical system including components, such as database servers, mass storage media, media library systems, and the like.

A.2. Example Server System Architecture

The server host systems described herein may be implemented in a wide array of computing systems and architectures. The following describes example computing architectures for didactic, rather than limiting, purposes.

Figure 2:
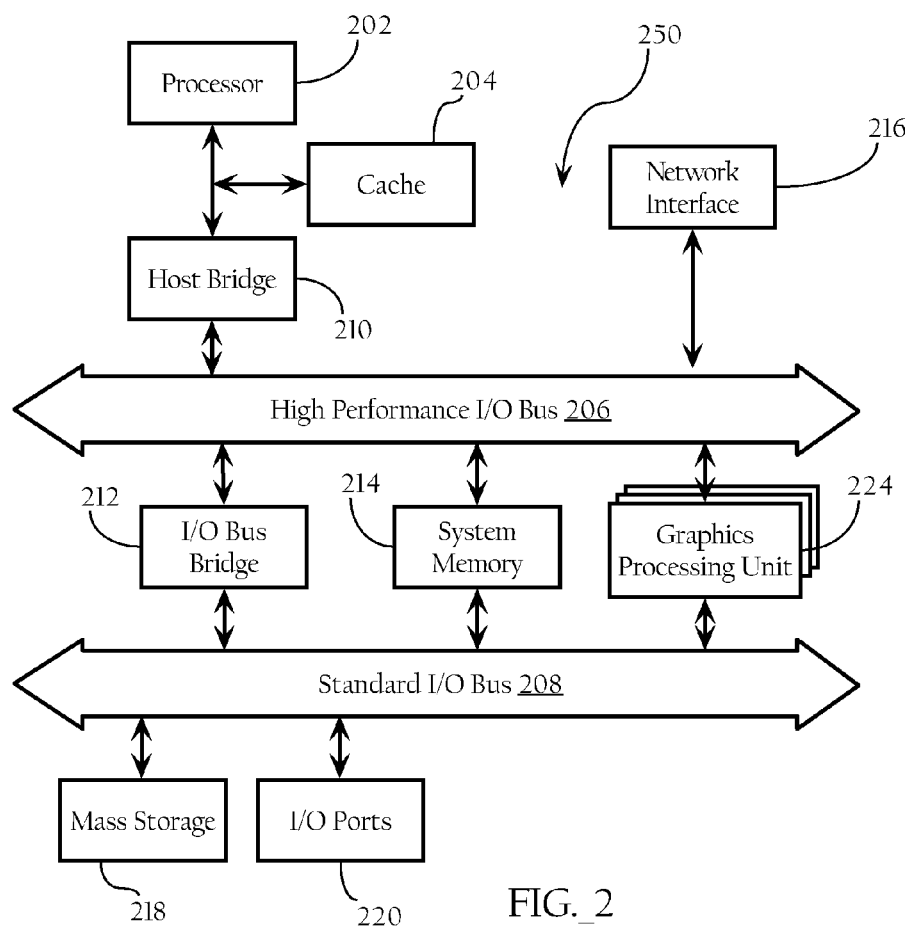
FIG. 2 is an example server system architecture according to one possible implementation of the invention.

FIG. 2 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. For physical servers hosting remote rendering device functionality, hardware system 200 may further include one or more graphics processing units 224 coupled to buses 206 and 208. In one implementation, the graphics processing unit 224 may be embodied in a graphics or display card that attaches to the server system architecture via a card slot. In other implementations, the graphics processor unit 224 may be integrated on the motherboard of the server system architecture. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

Graphics processing unit 224, in one implementation, comprises one or more integrated circuits and/or processing cores that are directed to mathematical operations commonly used in graphics rendering. In some implementations, the GPU 224 may use a special graphics unit instruction set, while in other implementations, the GPU may use a CPU-like (e.g. a modified x86) instruction set. Graphics processing unit 224 can implement a number of graphics primitive operations, such as blitting, texture mapping, pixel shading, frame buffering, and the like. Graphics processing unit 324 may be a graphics accelerator, a GPGPU (General Purpose GPU), or any other suitable processing unit.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device or other computer readable medium, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

B. Viewport Rendering Processes

A viewport is a rendered representation of a virtual scene or environment from a given spatial location in the virtual environment and according to one or more view transform parameters (such as pitch, yaw, and field of view). Viewports can be rendered by generating a Viewport State Data Object (VSDO), which, in one implementation, comprises a layered cube map, and using a pixel or fragment shader to generate pixel values for the viewport. A cube map is essentially six texture maps stitched into a cube. Each texture map includes texels, which are essentially pixel information regarding a scene relative to a common reference point. A texture map on the face of a cube can be generated by rendering a scene from a common reference point using the faces of the cube as window rectangles. Each texel may contain material properties (index of refraction, color, etc.), the distance from the reference point, and a surface normal vector. A set of layered texture maps representing a scene can be obtained using depth peeling. The number of peeling passes can be limited to control the number of layers.

Each texel stores information on all object points between the reference point and the farthest object point. To generate a rendered representation of a scene corresponding to a layered cube map, a graphics processing unit may trace rays from a common origin to determine the distances between the origin and objects in the scene, using a fragment shader unit to compute the radiance at points visible from the origin. The render processing typically involves rasterizing the scene geometry and finding the first hits where the rays pass through the pixels. This approach, however, requires regeneration of the cube map when the spatial location (origin) of the viewport changes, such as when a player in a virtual world moves throughout a scene.

The system and the methods described herein can be configured to efficiently circumvent these limitations, as well as limitations associated with client side rendering of virtual worlds. The proposed system, in one particular implementation, renders each client viewport remotely (relative to a given client), removing the burden of rendering a 3D scene (or part of the processing associated with rendering a 3D scene) from the local client device. 3D viewports, rather than being rasterized on the local client, are instead generated on a remote render device, which then transmits a visual representation of the viewport to the client device in a format (including, but not limited to a video stream) which the client can use to display the scene without requiring complex 3D rasterization. This process eliminates the need for the client to have specialized 3D rendering software or hardware, and/or the need to install or download any persistent render assets on the local system. The hardware resource requirements for the client are therefore roughly equivalent to those needed to play a continuous video stream.

In addition, implementations of the present invention can be configured to render multiple viewports, each corresponding to different spatial location and view transform parameters, using the same Viewport State Data Object. This allows the computing resources used to create the Viewport State Data Object to be used in connection with multiple users or viewports. In addition, this may allow distributed virtual world systems where peer nodes with sufficient graphics processing capabilities may render novel viewports for other peers.

The remote render device, which performs the actual 3D rendering for the client, may comprise a server (as discussed above) with one or more central processing units (CPUs), one or more network interfaces, an optional Graphics Processor Unit or GPU (if the CPU is not powerful enough to render the viewports in the methods described herein), and a storage system interface for accessing a data storage system that maintains virtual world assets or objects for rendering. A remote render device (RRD) server can be part of a centralized cluster of machines or it can be a node within a distributed peer-to-peer network. In both cases, the RRD server has the graphics capabilities required to render a 3D viewport of a virtual world, and also has enough bandwidth to transmit and transcode a simplified representation of the rendered view (e.g., a compressed video stream) to one or more clients. The remote render device server can supply both continuous and session-based viewport render data to a client:

1) Session based render packets: these render data packets represent discreet snapshots of a viewport, and are used for static representations of a scene that a client device can further manipulate with minimal complexity on the local system.
2) Continuous render streams: these render data streams are comprised of continuously updated, rendered representations of each viewport managed by a remote render device, which are sent in real time (such as a video stream) to each client associated with the viewport. Real-time RRD rendering of a dynamic scene and streaming back to the client enables real time interaction with the remotely rendered viewport with reduced lag.

The render data transmitted by a remote render device can be formatted in several ways for decoding and display by the client device, or for further processing and transcoding through a client that can additionally act as 'remote render device' node in a peer-to-peer cloud that extends the processing power of the root 'remote render devices' in a centralized server system. In some implementations, the viewport may be completely rendered, while, in other implementations, the partially-rendered viewport can be transmitted for further processing by a client or downstream node in a distributed system.

Complete Viewport Render

This format is comprised of a 2D image or video sequence created by a remote render device that fully encapsulates the viewport in a simple way for a client (e.g., a simple 2D image raster, such as Joint Photographics Experts Group (JPEG) or Portable Network Graphics (PNG)). A client accepting this form of render data can do so without 3D or imaging processing capabilities. The 'remote render device' may also output this data as a video stream viewable in most web browsers or other client applications by transcoding the render sequence into a common video format (such as Ogg, Motion Picture Experts Group (MPEG)-2, MPEG-4, Part 10 (a/k/a h.264), Motion JPEG (M-JPEG), etc).

Partial Viewport Render:

This render format exposes more information to a client device than the complete render format described above, allowing more powerful clients to finish rendering the viewport from a novel viewpoint (using the render methods described herein) without incurring additional rendering costs server side and thus freeing up server resources. This format further allows any arbitrary client with enough graphics processing power and bandwidth to retransmit novel, completely rendered viewports to thin clients without taxing the root remote render devices. A VSDO, as discussed above, contains a set of rendered layers of a cube map that are initially rasterized by a root 'remote render device', via depth peeling, where each layer of the rendered data segment contains depth information of a scene from a common reference point, material properties and optionally high dynamic range lighting values. This data encompasses enough information about the scene so that an (RRD server or client) can quickly create novel independent viewports, using the methods described herein, and stream them out to additional non-RRD capable clients.

VSDOs can be initially generated on a root RRD. The root RRD performs this generation efficiently on a GPU, using cube maps and multiple render targets using depth peeling or some other suitable process. The cube map layers can further be turned into 2D longitude latitude maps using the process illustrated in the pseudo code section set forth below and packed into standard 2D based representations which can further be sent as compressed video streams using a video codec designed for compressing 2D temporal video data. VSDOs can also contain partial scene representations (partial Viewport State Data Object) versus a full 360-degree panoramic dataset in a complete VSDO. Partial VSDOs can include top down or isometric tiles of a scene, which a thin client can subsequently use to scroll in 2D, without requiring the more complex image decoding of a complete VSDO.

As the spatial location from which a viewport is to be rendered varies from the reference point of the VSDO, a hit function can be used to trace rays from the spatial location of the viewport to the objects in the scene defined by the VSDO. The viewport rendering functionality described herein uses the search algorithms described below to render views of a scene using one or more common VSDOs rendered from different spatial location and view transform parameters. That is, using the HIT function defined below, a single VSDO or set of VSDOs can be used to render multiple viewports, each with a different spatial location (or reference point) and different view transform parameters (such as pitch and yaw).

To render a scene, a fragment shader computes the distance between the spatial location of the viewport and an object defined in the layer(s) of the cube map along a set of rays extending from the spatial location of the viewport. Since the spatial location of the viewport and the reference point of the cube map are often different, a search algorithm is used to find the distance for rendering of a given pixel. As described below, a two-phased search algorithm can be used. In a first phase, a linear search algorithm is used to compute a rough overshooting guess and an undershooting approximation that bound the intersection point of the ray. A second search process, bounded by the overshooting and undershooting values, searches for a more accurate intersection point.

B.1. HIT Function

Figure 4:
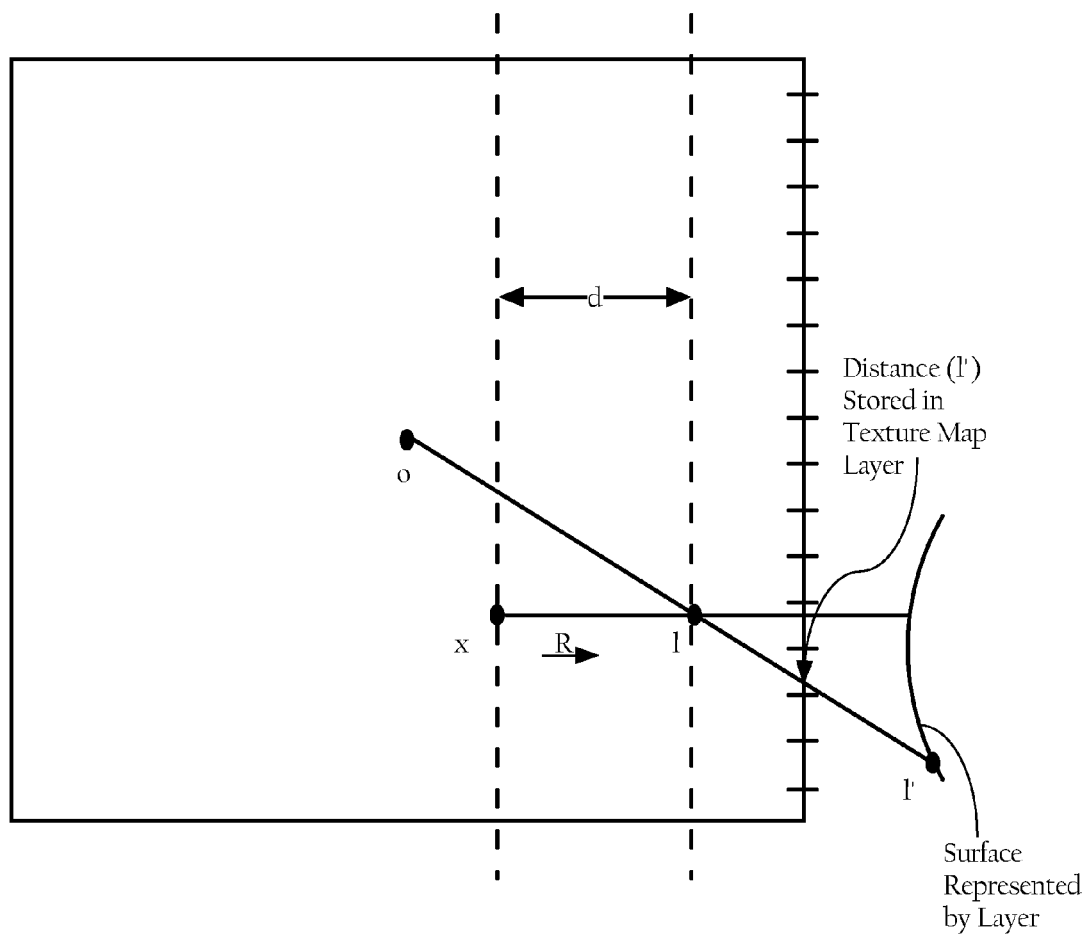
FIGS. 4 thru 6 are diagrams that graphically illustrate how rays can be traced from an arbitrary spatial location within a cube map where distances are defined relative to a common reference point.
Figure 5:
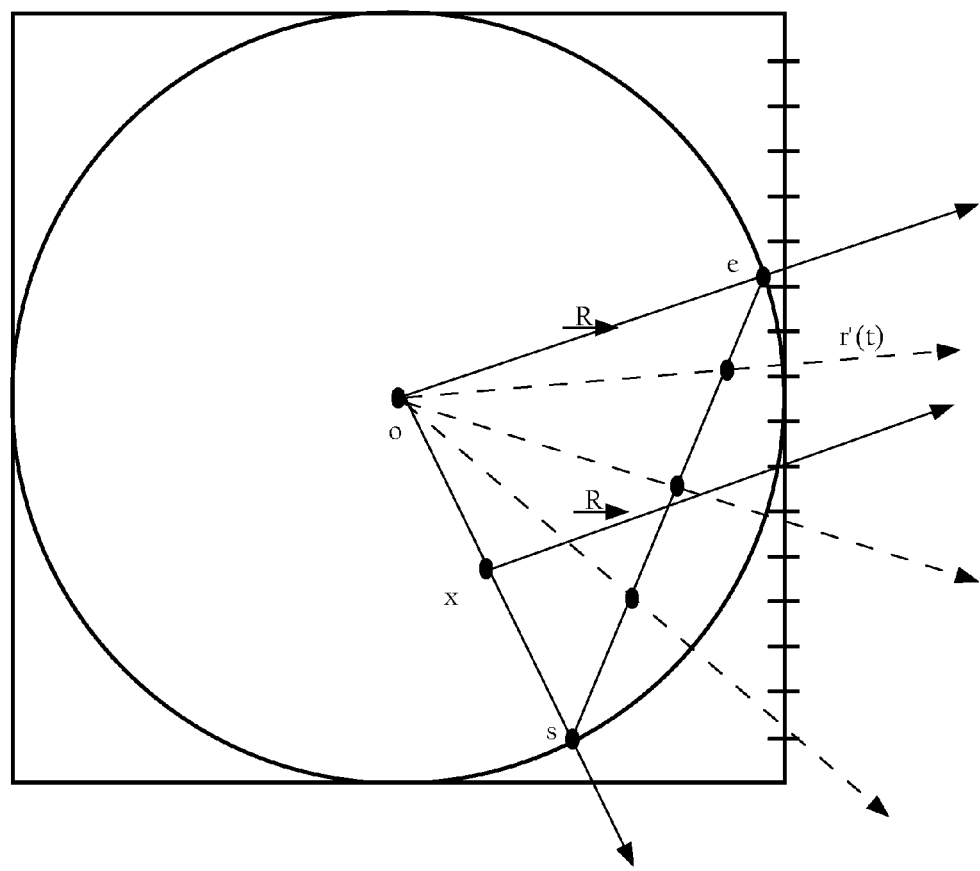
Figure 6:
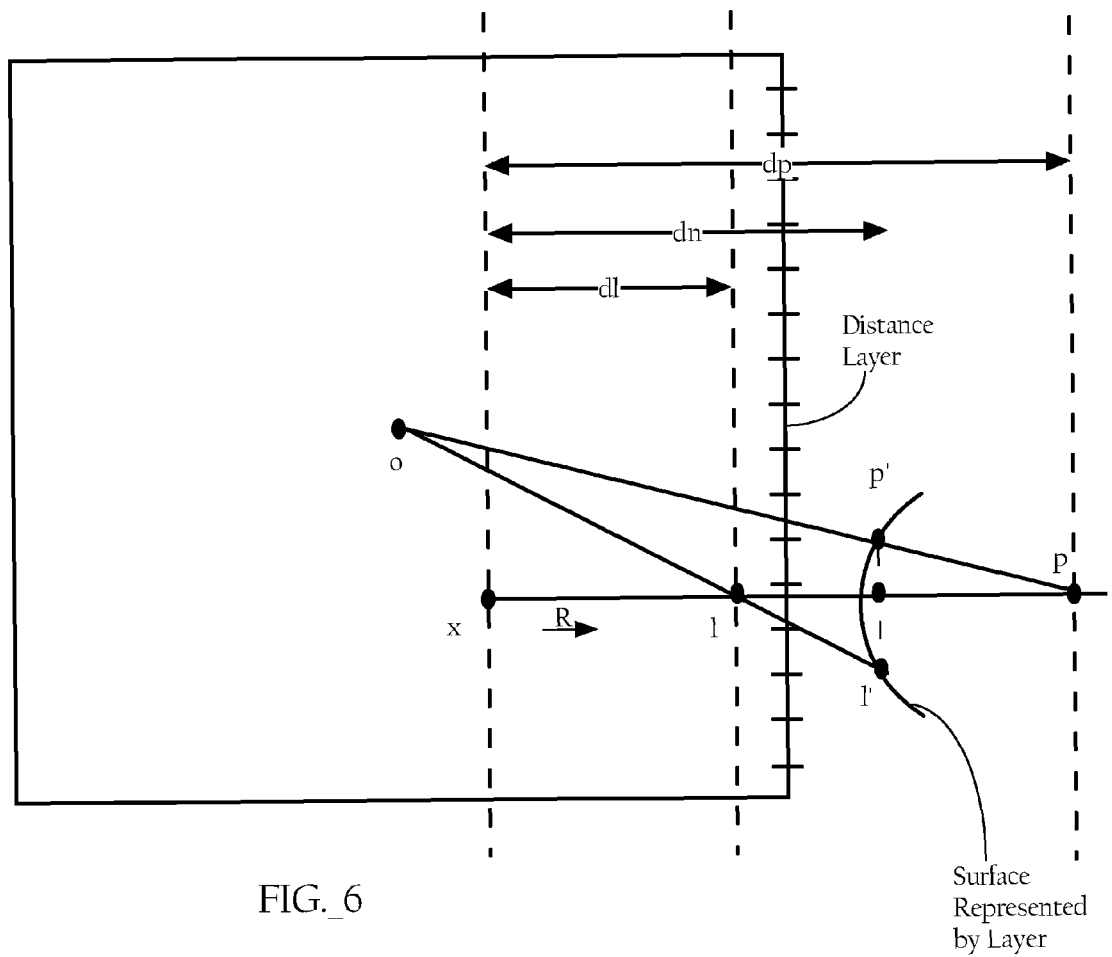

With reference to FIGS. 4 to 6, assume for didactic purposes, that point o is the reference point of the layered cube map of a VSDO, and the point x is the current spatial location from which a viewport is to be rendered. The distance d from point x to the first object intersection in a given layer can be defined by a ray of the equation $x+R*d$, where R is the direction of the ray. However, for a ray extending from point x in the direction R, it is necessary to search for the distance d given that the distances in the cube map are computed relative to the reference point o, and not the spatial location of the viewport (x). Referring to FIG. 4, the distance d can be approximated by reading the distance (l') of the surface represented by the cube map layer with the direction of $l=x+R*d$, and comparing it with the distance of the approximating point l on the ray $|l|$. If $|l|$ is approximately equal to $|l'|$, then the intersection is found. However, if the point on the ray (l) is in front of the surface ($|l|<|l'|$), then the current approximation is undershooting. If the point on the ray (l) is beyond the surface ($|l|>|l'|$), then the current approximation is overshooting. In a linear search process, a rough overshooting and undershooting approximation is computed. Within these approximations, a second more accurate search is conducted to find the ray end point or object intersection.

In a particular implementation, since the possible intersection points are on the ray defined by $x+R*d$, the search for the intersection or distance d can be conducted by checking points $r(d)=x+R*d$ with an increasing sequence of positive values of d, and detecting the first pair of subsequent or adjacent points, where one point of the pair overshoots and the second point undershoots. The actual intersection lies within these points.

The linear search, in one implementation, can involve marching on a line segment that looks the same as the ray from the reference point, except that its two endpoints are at the same distance. The endpoints of this line segment can be obtained by projecting the start of the ray, $r(0)$, and the end of the ray, $r(\infty)$, onto a unit sphere, resulting in a first endpoint $s=x/|x|$ and second endpoint $e=R/|R|$. The intersection is found at the texels that are seen at a direction between s and e, as shown in FIG. 5.

The intersection algorithm can search these texels, making uniform steps along the line segment s-e, where $r'(t)=s*(1-t)+e*t$ for $t=0, \Delta t, 2\Delta t, \ldots, 1$. The correspondence between ray parameter d and parameter t can be found by projecting r' onto the ray, which leads to d(t)=(|x|/|R|)*t/(1−t). A fragment shader can take inputs of ray origin x (the spatial location of the viewport), direction R, and the cube map, and sequentially generate ray parameters d on points of the ray r and return an undershooting ray parameter dl and an overshooting ray parameter dp. The variables llp and ppp in the following fragment shader code listing represent ratios |l|/|l'| and |p|/|p'|, respectively.

```
float a = length(x) / length (R);
bool undershoot = false, overshoot = false;
float dl, llp; //Ray parameter and |l|/|l'| of last undershooting
float dp, ppp; //Ray parameter and |p|/|p'| of last overshooting
float t = 0.0001f;
while(t < 1 && !(overshoot and undershoot)) {
        float d = a * t / (1 − t);
        float3 r = x + R * d;
        float ra = texCUBE1od(map, float4(r,0)). a;
        if (ra > 0) {
                float rrp = length(r)/ra;
                if (rpp < 1) {
                        dl = d;
                        lpp = rrp;
                        undershoot = true;
                } else {
                        dp = d;
                        ppp = rrp;
                        overshoot = true;
                }
        } else {
                undershoot = false;
                overshoot = false;
        }
        t += Dt;
}
```

The search algorithm finds a pair of undershooting and overshooting values of d in a layer of a cube map, making uniform steps Dt in texture space along the ray. Step size Dt can be set based on the length of line segment s-e and the texel resolution of the cube map. At a given texel, the distance can be obtained from the alpha channel of the cube map. This linear search can be run for each layer of the cube map. The layer where the dp parameter is minimal contains the first hit of the ray.

In some implementations, the linear search can be accelerated by determining minimum and maximum distance values (d) that bound the search space. When a ray is traced, it is intersected with spheres centered at the reference point (o) and having radii equal to the minimum and maximum distance values in the layer of the cube map. These two intersection points may reduce the ray space that needs to be searched and reduces the length of the line segment s-e to allow for fewer search steps with the same accuracy.

With the undershooting and overshooting distance values (dl, dp), a secant search can be used to determine the intersection. The secant search assumes that the surface is planar between the texel map distances of the overshooting and undershooting points. With this assumption, a line between l' and p' is intersected by the ray at a point r=x+R*dn, where $$dn=dl+(dp-dl)*(1-|l|/|l'|)/(|p|/|p'|-|l|/|l'|).$$

If a single secant step does not provide accurate results, dn can replace dp or dl (always keeping one of the overshooting or undershooting approximations) and proceed to iteratively compute dn again. The following fragment shader code illustrates an example secant search implementation.

```
for (int I = 0; I < NITER; i++) {
        dn = dl + (dp − dl) * (1-lpp)/ppp-lpp);
        float3 r = x + r * dn;
        float rrp = length(r) / texCUBElod(map, float4(r,0)).a;
        if (rrp < 0.999) {
                lpp = rrp;
                dl = dn;
        } else if (rrp > 1.0001) {
                ppp = rrp;
                dp = dn;
        } else i = NITER;
}
```

The linear search algorithm that processes every layer of the cube map, and the secant search that processes a single layer, can be incorporated into a function—a HIT( ) function providing a tool that can trace a ray from an arbitrary spatial location within a scene defined by a cube map.

B.2. Viewport Rendering

The following code segment illustrates fragment shader pseudo code that can be used to render an arbitrary viewport position from layers of cube map samplers with depth information.

```
// in this simple example, a cube mesh, centered at the camera
origin, is passed into the pixel shader for rasterization
// The VSDO is represented by a cubemap array, which is tied
to the SceneID
// The ViewPortID is used to lookup ViewPort specific data for
the Novel ViewPort being rendered using this function (i.e.
position, FOV etc).
// result is the output fragment data to be written to the render
target
function backdrop(int SceneID, int ViewPortID)
{
    // the view vector can be calculated by getting a normal to
the vertex position of a skybox passed from the vertex shader
    // or it can calculated completely in the pixel shader for the
screen space fragment with a view transform set in a constant
buffer and indexed with ViewPortID
    float3 ViewDir=normalize(vertexpos.xzy);
    // CubeMapArray is an array of Cubic Environment maps,
with depth information
    // camerapos[ViewPortID] a float3 constant buffer entry
storing the viewport's position in world space
    // probepos is a float3 constant buffer entry storing the
world space origin of the cubic environment/depth map being
tested for a ray intersection
    // Hit(float3 pos,float3 ray, inout int LayerID) is a function
that performs raycasting on all loaded depth cube map samplers using the ray intersection system described
    // The Hit( ) function's 3rd parameter is an inout value that
is set to the cube map ID where that the ray intersects by the
Hit( ) function after testing is done on all depth layers in the
cube map array
    // the LayerID can index a cube map array, which along the
HitPoint return value, can lookup the proper fragment to
render for this viewport
    int LayerID;
    float3    HitPoint=Hit(camerapos[ViewPortID]-probepos
[SceneID],ViewDir,LayerID)
    result=texCUBE(CubeMapArray[LayerID],
HitPoint);
}
```

While a centralized server farm could include one render server for every connected client, thus ensuring that each client has a dedicated graphics device for remotely rendering a client viewport, this would be inefficient compared to a client side-rendering model where a single virtual world server would handle many hundreds of users at once, due to the low complexity of processing and transmitting simple state information packets (i.e., object position, velocity, etc.). The complexity of rendering a 3D viewport is orders of magnitude more complex than processing state information, and thus, a render server that would perform brute force rendering naively for each viewport would require disproportionately more processing power per user than a state-based server model.

The rendering methods described herein can reduce the processing time required for rendering novel viewports of a scene after a VSDO encompassing the novel viewport's elements has been created. This process vastly increases the number of simultaneously rendered viewports that a single render device can generate. Rather than re-render each viewport naively, which, in the case of complex scenes would require a linear scaling of processing power per additional viewport, the system can be configured to render additional viewports using the information contained in one or more VSDOs, which requires only a simple fragment operation per rendered screen pixel, and is thus more efficient than brute force rendering of a scene containing complex and dense meshes. For example, this would allow an RRD server to generate a set of VSDOs for a segment of a virtual world, and re-use this generated set of VSDOs to provide rendered viewport output to multiple clients. In some implementations, the RRD server could provide the VSDOs to RRD clients or peers for rendering of viewports.

B.3. Overview—Creating A Viewport State Data Object

A viewport state data object (VSDO) contains layers of scene information that are generated from an arbitrary reference point in a 3D scene on a remote render device. The viewport data object layers can be efficiently generated on a GPU in the following manner. In other words, GPUs have facilities that generate viewport state data objects given information regarding the objects in a scene and a reference point.

1) A 3D scene managed by an RRD, each time it is significantly changed, is rendered into a series of cubic environment maps, or a single cubic environment map set, if multi-element cube maps are supported by the graphics processor unit. One GPU can be utilized to render the cubic maps. In other implementations, multiple GPUs can be used to separately render a face of a cubic map into a commonly accessible memory space to accelerate generation of the VSDO.

2) The multiple layer elements of the rendering output include: depth information and color information, and, for relighting and deferred shading purposes, may optionally contain per fragment surface normals, UV texture coordinates, material properties and high dynamic range lighting information.

3) If the VSDO being generated is intended to allow novel viewports to be created from different spatial reference positions (using Render Method 2, below), then the scene is rendered using depth peeling. These additional cube maps (Depth layer sets) also comprise the elements described above, and are generated for each additional depth layer that is required to re-render overlapping elements within the radial clipping plane range of the viewport state date object (defined as the far clipping plane of the camera used to generate the VSDO).

4) Static and dynamic objects can further be separated into additional layers, so that static scene elements can be cached in one set of cube maps-based VSDOs, and dynamic scene elements can be updated in another set of cube maps of the VSDOs (using operations 1-3) described above, enabling even faster generation of a VSDO when static scene elements are cached and combined with VSDOs containing only dynamic scene elements.

5) The cube map VSDO layers generated in steps 1-4 can be transformed into 2D packed VSDOs (for example longitude latitude map, parabolic map set, helix map) in order to facilitate storage and transmission of the VSDO in 2D image formats.

6) Sequences of complete VSDOs generated in linear or grid-based spatial sets can further be stacked together into a volumetric texture (for single sampler access within a GPU shader) and also compressed as a sequence of grouped frames through standard 2D video codec techniques.

C. Efficient Viewport Control and Streaming System

Figure 3:
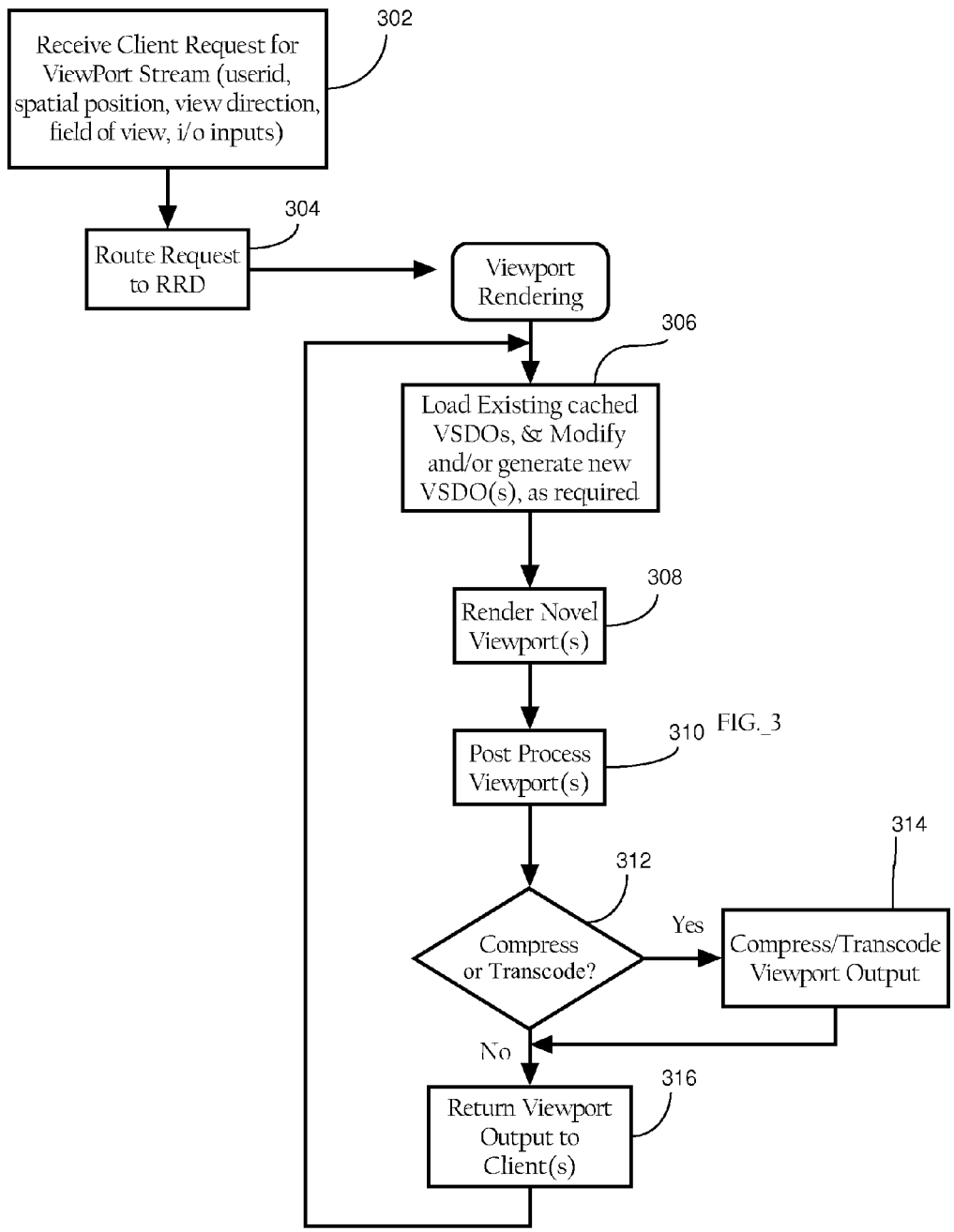
FIG. 3 is a flow chart illustrating a process flow according to one possible implementation of the invention.

FIG. 3 illustrates a process flow directed to a system that interacts with client devices and streams rendered viewport data to the client devices. In a particular implementation, a user on a client system 82 or 84 requests, through a network stream to a world state server, that a novel viewport with a specific view and spatial transform is to be rendered by a remote render device, and that the output is to be sent back to the client for display 302. The world state server, which manages a list of RRD nodes (either centralized or on a P2P network), accepts the client request and routes the viewport render request to the appropriate RRD which could best generate or access a VSDO closest to the Novel Viewport's spatial position 304. As a given user navigates within the virtual environment, changing the spatial position or view transform parameters, additional client requests may be transmitted to the world state server, which routes the client requests to the RRD node. In one implementation, the world state server maintains the state of one or more avatars, objects and other assets within the virtual environment. The state of these objects (such as spatial position and orientation parameters) may be provided to the remote render devices when generating VSDOs.

As FIG. 3 illustrates, a given RRD accesses a buffer of pending viewport render requests sent by the world state server and either loads existing cached VSDOs and modifies or generates new VSDO(s) that will be required to fulfill the requests of each client 306. In this step for example, an RRD may regenerate or modify a VSDO if the state of one or more objects has changed. Rendering of each of the novel viewports is performed using render method 1 or 2, as discussed below 308. The instant RRD server may request an additional VSDO from another RRD node if the requested novel viewport requires a VSDO that is not optimally rendered on a single RRD. In a given implementation, one or more VSDOs may correspond to a room in a virtual environment for example. To render viewports for users whose avatars are located within the room for example, the RRD may process the VSDOs against the spatial and view transform parameters of the corresponding viewports. In some implementations, the RRD may render one viewport for multiple requests, if the spatial and view transform parameters are within a threshold distance. As FIG. 3 illustrates, the rendered viewport(s) may be post-processed (310) (e.g., adding text overlays, etc.) either by the root RRD, or an additional RRD node which can handle this task more efficiently. Furthermore, if compression or transcoding of the viewport is needed (based on either tags passed into the render request or server-side analysis of the client's abilities, such as HTTP header info), the world state server passes along a further request, or flags the client request, to the RRD in step 304 to either compress or transcode the viewport render on the same RRD (potentially on another CPU core or GPU core on the RRD) or to pass along the viewport render to another RRD node that can more efficiently handle this task (312, 314). The post processed viewport render is routed and sent back to the client from the RRD (if no compression or transcoding is needed) or from a compressed and transcoded representation generated by the RRD 316. In this manner, an RRD server may utilize the facilities of a GPU, for example, to render complex 3-D scenes and stream novel viewports out to multiple clients, which then do not need client-side rendering engines which consume substantial processing resources. Embodiments of the invention facilitate use of the system with thin client devices, such as hand-held and mobile devices.

The client receives the rendered viewport, displays it on the local graphics device, and, as discussed above, may continue to asynchronously pass any further input and render requests relating to the viewport to the world state server. The process described above, when used to stream viewports, is essentially iterative in that the RRD repeats the processes described herein to generate rendered viewports for one or more clients and streams the rendered viewport data to the clients. As the clients manipulate I/O devices, such as joysticks and keyboards, the world state server may change the spatial position and view transform of corresponding viewports, as well as the state of the avatars and other objects within the virtual environment. In one implementation, a client can send simple keyboard or other local input state information to the world state server, moving all operations relating to viewport rendering for the client to the remote render system. The RRD could then handle and process world state collision requests using existing VSDO sets used for rendering to also perform collision detection and navigation logic efficiently for a large number of clients.

If a viewport state data object is stored in a 2D format (as described above), the data contained therein can either be converted back into a cube map for efficient rendering on a GPU, or the data can be accessed directly in the rendering routines described below. This can be done through pixel shader operations that map 3D cube map texture lookups into 2D texture coordinate lookups, using the inverse transform that encoded the VSDO cube map layer into a 2D raster (see following pseudocode).

Fragment shader pseudo code to turn a cube map into longitude/latitude map
// uv is (x,y) uv coordinate of pixel being rendered into a 2D target
// CubeMap is cube map texture sampler being converted into a 2D longitude/latitude map
// result is the output fragment data to be written to the render target
function CubicMapto2DMAP(float2 uv, sampler CubeMap)
{
　　float rx=radians(180*(uv.x−0.5)*2);
　　float ry=radians(−180*(uv.y−0.5));
　　float3 R; // the 3 coordinate lookup vector for the CubeMap being converted
　　R.x=sin(−rx)*cos(ry);
　　R.z=cos(−rx)*cos(ry);
　　R.y=sin(ry);
　　result=texCUBE(CubeMap,R);
}

C.1. Viewport Rendering

The complete VSDO can be rendered in 2 ways to create a novel viewport (NV), without requiring further complex rasterization of scene geometry. The choice between rendering methods depends on the relation between the center or reference point of the VSDOs and the spatial position or location of a given viewport.

C.1.a. Render Method 1: Novel Viewport Orientation

This method treats the VSDO as a cubic environment map (e.g., a sky box), centered about a novel viewport's world space and view origin. This method allows efficient re-rendering of the novel viewport using any arbitrary orientation (e.g., pitch, yaw, roll). In a scene with complex geometry, reducing the re-rendering process to a simple rasterization of a panoramic environment can therefore dramatically increase the speed by orders of magnitude versus performing a complete re-render of the entire scene for each viewport. This method can be used in cases where the novel viewport's spatial reference position is approximately the same as the VSDO's capture radius center (reference point), and only the viewport's orientation (yaw, pitch, roll) and perspective transform need to be changed to create or render the viewports. According to this render method, a simple skybox cube model is centered at the novel viewport's origin. The RRD, using the facilities of a GPU, attaches one or more VSDOs to a fragment or pixel shader as available inputs for the render pass. A pixel or fragment shader is a GPU resource that renders or shades pixels in a memory map in a fast, parallel processing operation. Depending on the capabilities and configuration of the GPU, multiple VSDOs may be mapped to a pixel shader, or the mapping may be a one-to-one relationship. Each novel viewport is rendered from its unique orientation and perspective parameters. In a particular implementation, the skybox pixel shader samples the VSDO using the view vector from the origin to render the VSDO as a panoramic environment.

An example application of this method would be to generate a novel viewport for each avatar in an enclosed room of a virtual world, where each generated viewport's orientation and perspective is aligned per render frame to keep its target avatar centered and properly cropped in the novel viewport (assuming each novel viewport shares its origin with the others at the center of the room, the point where the VSDO is generated).

C.2. Render Method 2: Novel Viewport Position and Orientation

Render method 2 expands the subset of novel viewports generated using render method 1 to include novel viewports that are generated from any arbitrary 3D spatial position (in addition to orientation and perspective) within the VSDO's capture radius. Additional VSDO nodes can be dynamically linked together as additional sampler stages at render time in order to enable the novel viewport to rasterize elements outside of the bounds of a single VSDO capture radius. The method applies the parallel pixel shader processing power of a GPU to perform ray intersections tests on a VSDO, using the VSDO's depth layers to generate a novel viewport from any point within the bounds of the VSDO's capture radius.

According to render method 2, the novel viewport's requested world (spatial) and view transform are set (i.e., as shader constants if performing the rendering on a GPU). As above in Render Method 1, the depth and render layers of each VSDO required to render the novel viewport are prepared for rendering (i.e. loaded as texture samplers on a GPU), and a skybox mesh can be prepared as a dummy environment map as described in render method 1 and centered at the novel viewport's local rendering origin as in render method 1.

The viewport is rasterized from the novel viewport's requested world and view transform using the following fragment operation: Each fragment performs a ray traced hit test (see first pixel shader pseudocode section, above) on all VSDOs loaded in to the GPU for the viewport, using the world or spatial position set as the origin of the ray, and the ray's direction vector set to the match the view transform parameters. The ray hit test algorithm (see above), returns hit point and VSDO fragment layer information. Furthermore, depth information from a previously generated and cached VSDO of the scene's static elements can be used to merge these static scene elements with the new VSDO by including the cached VSDO. Overlapped elements can be processed and sorted correctly. If the ray-traced VSDO fragment contains intermediate render state data (normal maps, diffuse, specular, Fresnel, UV, material ID and other render elements) then deferred shading can be performed on these elements to produce a completely rendered fragment. The final processed fragment generated is rendered into screen space in the novel viewport's render buffer.

The skybox mesh is optional for both Render Methods 1 and 2. A pixel shader that incorporates the novel viewport's transform as a shader constants could rasterize the novel viewport entirely in a fragment or pixel shader, thus allowing for multiple tiled novel viewport frames to be rendered in a large render target in a single pass, increasing the efficiency of the system even further. For example, in a multiple novel viewport environment, each novel viewport has spatial (world) and view transform parameters. The method of the invention can be configured to load the constants (spatial and view transform parameters) for all active viewports into a buffer, and to associate the locations of the memory map of the GPU to corresponding viewports and their constants. The pixel shader, as it writes each pixel into the memory map, applies the constants associated with that region of the memory map. By dividing the GPU memory map for multiple viewports, multiple viewport outputs can be generated in one render pass to improve scalability. For example, a particular graphics processor has a 8192×8192 pixel memory map, which allows a fragment or pixel shader to render 1024 256× 256 pixel viewports in one render pass. An RRD may then post-process and transmit the output to the clients corresponding to the viewports.

C.3. Post Process Rendering On Novel Viewport

Once a novel viewport is generated using Render Method 1 or Render Method 2, it can further be re-rendered and differentiated into separate output streams for clients that may share the same viewport generated from Render Methods 1 or 2, but further require the application of minor render settings and/or overlay information.

Minor Render Settings: These effects are performed on a source novel viewport's render data and may include vignette, exposure control, lens flares, chromatic aberrations, ghosting and depth of field. These settings can be different for multiple users sharing the same viewport.

Overlay Information: This render pass adds visual or textual interface or surface scene elements specific to each client sharing a viewport. Depth sorted decal, sprite or projection map overlays can be applied onto a novel viewport specific to each user. Optionally, using raw UV/Material ID deferred shading data that may be incorporated in the novel viewport's texels, novel decals can be rendered over any arbitrary surfaces in the scene. Overlay information processing and decal mapping may also be performed client-side.

Particular embodiments of the above-described process might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many possible orderings of the steps in the process described above and many possible modularizations of those orderings. Further, in embodiments where processing speed is not determinative, the process might run in the control plane rather than the data plane. In addition, while the embodiments discussed above are described as operating in connection with cubic maps, the invention can be used to operate in connection with any arbitrarily configured data structure that contains voxelized or per-pixel spatial information associated with the objects of a scene. As a result, the invention is not limited to the specific examples and illustrations discussed above, but only by the following claims and their equivalents.

What is claimed is:

1. An apparatus for rendering a plurality of viewports of a three-dimensional virtual environment, the apparatus comprising
one or more network interfaces;
a memory;
one or more processors; and
a non-transitory computer readable medium comprising a remote rendering module that includes instructions when executed by the one or more processors are operable to cause the one or more processors to:
access a buffer of client requests identifying respective spatial locations and view transform parameters of each of the plurality of viewports to be rendered, wherein each of the viewports is a representation of the three dimensional virtual environment from a respective spatial location in the three dimensional virtual environment, the representation is rendered according to respective view transform parameters;
generate one or more viewport state data objects based on the client requests;
render the plurality of viewports based on the one or more viewport state data objects such that at least two of the plurality of viewports are rendered using a particular one of the viewport state data objects;
transcode output comprising the rendered viewports into a video format; and
transmit the output as a video stream to a client device.

2. The apparatus of claim 1 wherein the viewport state data objects each contain voxelized or per-pixel spatial information associated with objects of a scene of the three-dimensional virtual environment relative to a common reference point.

3. The apparatus of claim 1 wherein the viewport state data objects each comprise one or more cube maps containing voxelized or per-pixel spatial information associated with objects of a scene of the three-dimensional virtual environment relative to a common reference point.

4. The apparatus of claim 2 wherein to render a viewport associated with a spatial location different from the common reference point and one or more view transform parameters, the remote render module further comprises computer-readable instructions operable to cause the one or more processors to
access at least one of the viewport state data objects of a particular one of the viewports comprising spatial information corresponding to the objects of the scene relative to the common reference point;
render the scene using the viewport state data object by, in part, tracing one or more rays from the spatial location to the objects defined in the viewport state data object.

5. The apparatus of claim 3 wherein to render a viewport associated with a spatial location different from the common reference point and one or more view transform parameters, the remote render module further comprises computer-readable instructions operable to cause the one or more processors to access at least one of the viewport state data objects of a particular one of the viewports comprising spatial information corresponding to the objects of a scene relative to a common reference point;

render the scene using the viewport state data object by, in part, tracing one or more rays from the spatial location to the objects defined in the viewport state data object.

6. The apparatus of claim 1 wherein the remote rendering module further comprises computer-readable instructions operable to cause the one or more processors to stream the rendered viewport output as a series of video frames.

7. An apparatus comprising
    one or more network interfaces;
    a memory;
    one or more graphics processing units, each graphics processing unit operative to generate a plurality of viewport state data objects corresponding to a region of a virtual environment, and render one or more viewports of a three-dimensional virtual environment, wherein each viewport includes respective spatial location and view transform parameters;
    one or more processors; and
    a non-transitory computer readable medium comprising a remote rendering module for rendering one or more viewports of a three-dimensional virtual environment, the remote rendering module comprising computer readable instructions operable to cause the one or more processors to:
        access a buffer of client requests identifying respective spatial locations and view transform parameters of each of the viewports to be rendered, wherein each of the viewports is a representation of the three dimensional virtual environment from a respective spatial location in the three dimensional virtual environment, the representation is rendered according to respective view transform parameters;
        access a graphics processing unit that generates one or more viewport state data objects based on the client requests and renders the plurality of viewports based on the one or more viewport state data objects such that at least two of the plurality of viewports are rendered using a particular one of the viewport state data objects;
        transcode output comprising the rendered viewports into a video format; and
        transmit the output of the graphics processing unit as a video stream to a client device.

8. The apparatus of claim 7 wherein the viewport state data objects each contain voxelized or per-pixel spatial information associated with objects of a scene of the three-dimensional virtual environment relative to a common reference point.

9. The apparatus of claim 7 wherein the viewport state data objects each comprise one or more cube maps containing voxelized or per-pixel spatial information associated with objects of a scene of the three-dimensional virtual environment relative to a common reference point.

10. The apparatus of claim 8 wherein to render a viewport associated with a spatial location different from the common reference point and one or more view transform parameters, the remote render module further comprises computer-readable instructions operable to cause the one or more processors and the one or more graphics processing units to access at least one of the viewport state data objects of a particular one of the viewports comprising spatial information corresponding to the objects of the scene relative to the common reference point;

render the scene using the viewport state data object by, in part, tracing one or more rays from the spatial location to one or more objects defined in the viewport state data object.

11. The apparatus of claim 9 wherein to render a viewport associated with a spatial location different from the common reference point and one or more view transform parameters, the remote render module further comprises computer-readable instructions operable to cause the one or more processors and the one or more graphics processing units to access at least one of the viewport state data objects of a particular one of the viewports comprising spatial information corresponding to the objects of the scene relative to the common reference point;

render the scene using the viewport state data object by, in part, tracing one or more rays from the spatial location to one or more objects defined in the viewport state data object.

12. The apparatus of claim 7 wherein the remote rendering module further comprises computer-readable instructions operable to cause the one or more processors to stream the rendered viewport output as a series of video frames.

13. A method comprising
    accessing, by a processor, a plurality of viewport state data objects comprising respective spatial information corresponding to one or more objects of a scene relative to a common reference point;
    rendering, by the processor, the scene using the viewport state data objects for a plurality of viewports, each viewport is a representation of a three dimensional virtual environment from a respective spatial location and rendered according to respective view transform parameters such that at least two of the plurality of viewports are rendered using a particular one of the viewport state data objects, wherein the spatial location is different from the common reference point;
wherein rendering the scene comprises tracing one or more rays from the spatial location to one or more objects defined in the viewport state data object; and
    transcoding, by the processor, output comprising the rendered scene into a video format; and
    outputting, by the processor, the transcoded data comprising a video stream associated with the rendered scene to one or more remote hosts.

14. The method of claim 13 wherein the viewport state data object comprises a cube map including one or more layers of spatial information associated with the one or more objects of the scene.

15. The method of claim 13 further comprising receiving, by the processor, the viewport state data object from a root remote rendering device.

16. The method of claim 13 wherein the one or more remote hosts are peers in a peer-to-peer network.

17. The method of claim 13 further comprising
    accessing, by the processor, a buffer of client requests identifying spatial and view transform parameters of one or more viewports;
    generating, by the processor, one or more viewport state data objects based on the client requests.

18. The method of claim 13 wherein a graphics processing unit is utilized to render the scene.

\* \* \* \* \*